United States Patent [19]

Bales et al.

[11] Patent Number: 5,598,458
[45] Date of Patent: Jan. 28, 1997

[54] TELECOMMUNICATION SWITCHING SYSTEM HAVING TRANSPARENT WIRELESS FEATURES

[75] Inventors: Bruce M. Bales, Louisville; Gary L. Griffith, Arvada; Vijai Prakash, Boulder, all of Colo.

[73] Assignee: Lucent Technologies Inc., Murray Hill, N.J.

[21] Appl. No.: 371,652

[22] Filed: Jan. 11, 1995

Related U.S. Application Data

[63] Continuation of Ser. No. 995,417, Dec. 18, 1992, abandoned.

[51] Int. Cl.[6] .................................................. H04Q 7/20
[52] U.S. Cl. ................................ 379/58; 379/59; 379/63; 379/219
[58] Field of Search .............................. 379/58, 59, 61, 379/63, 219, 220, 221, 230, 205, 210, 211, 212; 370/110.1

[56] References Cited

U.S. PATENT DOCUMENTS

| | | | |
|---|---|---|---|
| 4,696,028 | 9/1987 | Morganstein et al. | 379/273 |
| 4,761,807 | 8/1988 | Matthews et al. | 379/89 |
| 4,878,216 | 10/1989 | Yunoki | 370/60 |
| 4,896,319 | 1/1990 | Lidinsky et al. | 370/60 |
| 4,899,333 | 2/1990 | Roediger | 370/60 |
| 4,988,209 | 1/1991 | Davidson et al. | 370/58.2 |
| 5,001,710 | 3/1991 | Gawrys et al. | 370/110.1 |
| 5,012,512 | 4/1991 | Basso et al. | 379/218 |
| 5,014,266 | 5/1991 | Bales et al. | 370/60.1 |
| 5,016,243 | 5/1991 | Fite, Jr. | 370/16 |
| 5,023,780 | 6/1991 | Brearley | 364/200 |
| 5,023,868 | 6/1991 | Davidson et al. | 370/62 |
| 5,036,535 | 7/1991 | Gechter et al. | 379/210 |
| 5,051,992 | 9/1991 | Taniguchi et al. | 370/110.1 |
| 5,062,103 | 10/1991 | Davidson et al. | 370/58.1 |
| 5,251,248 | 10/1993 | Tokunaga et al. | 379/58 |
| 5,260,986 | 11/1993 | Pershan | 379/67 X |
| 5,353,331 | 10/1994 | Emery et al. | 379/58 |

*Primary Examiner*—Curtis Kuntz
*Assistant Examiner*—G. J. Oehling
*Attorney, Agent, or Firm*—John C. Moran

[57] ABSTRACT

A software application program terminating a directory number for all incoming calls directed to the directory number and determining the operations that should be performed with respect to a mobile unit and a telephone station set. The software application program then directs the incoming calls to the mobile unit and telephone station set regardless of where these units are connected to a telecommunication system. An outgoing call from the mobile unit or telephone station set is switched to the software application program which then switches the outgoing call to the destination telephone station set as if the outgoing call had originated at the location of the software application program. Also, the originating directory number used in placing the outgoing call is the directory number associated with the software application program. Two dialing number plans are used: the directory number plan which consists of standard telephone numbers and a secondary dialing plan. The secondary dialing plan is utilized by the software application program to direct and receive calls from the mobile unit and the telephone station set.

26 Claims, 10 Drawing Sheets

NODE HIERACHY

DIRECTORY DIALING PLAN HIERACHY

SECONDARY DIALING PLAN HIERACHY

FIG. 7

DIALING PLAN TABLE 708 NODE 102

| TEL # | NODE # | OWNERSHIP | STATUS |
|---|---|---|---|
| 1XXX | 101 | 2 | 1 |
| 2XXX | 104 | 2 | 1 |
| 3XXX | 106 | 2 | 1 |
| XXXX | NMS | 1 | 1 |

(705)

LEVEL 5 ROUTING TABLE 706 - NODE 102

| TEL # | NODE |
|---|---|
| 1XXX | 101 |
| 2XXX | 104 |
| 3XXX | 106 |
| XXXX | 102 |

(702, 701)

LEVEL 4 ROUTING TABLE 707 NODE 102

| NODE # | LDC OF | # OF HOPS |
|---|---|---|
| 101 | 150 | 1 |
| 104 | 150 | 2 |
| 106 | 160 | 1 |

DIALING PLAN TABLE 711 NODE 101

| TEL # | NODE # | OWNERSHIP | STATUS |
|---|---|---|---|
| 1XXX | 102 | 1 | 1 |

(704)

LEVEL 5 ROUTING TABLE 709 - NODE 101

| TEL # | NODE |
|---|---|
| 1XXX | 101 |
| XXXX | 102 |

LEVEL 4 ROUTING TABLE 710 NODE 101

| NODE # | LDC OF | # OF HOPS |
|---|---|---|
| 101 | 150 | 1 |
| 104 | 155 | 1 |
| 105 | 151 | 1 |

DIALING PLAN TABLE 704 NODE 104

| TEL # | NODE # | OWNERSHIP | STATUS |
|---|---|---|---|
| 20XX | 109 | 2 | 1 |
| 2XXX | 102 | 2 | 1 |

LEVEL 5 ROUTING TABLE 713 - NODE 104

| TEL # | NODE |
|---|---|
| 20XX | 109 |
| 2XXX | 104 |
| XXXX | 102 |

LEVEL 4 ROUTING TABLE 712 NODE 104

| NODE # | LDC OF | # OF HOPS |
|---|---|---|
| 101 | 155 | 1 |
| 102 | 155 | 2 |
| 109 | 158 | 1 |

DIALING PLAN TABLE 715 NODE 109

| TEL # | NODE # | OWNERSHIP | STATUS |
|---|---|---|---|
| 20XX | 104 | 2 | 1 |

LEVEL 5 ROUTING TABLE 716 - NODE 109

| TEL # | NODE |
|---|---|
| 20XX | 109 |
| 2XXX | 104 |

LEVEL 4 ROUTING TABLE 717 NODE 109

| NODE # | LDC OF | # OF HOPS |
|---|---|---|
| 104 | 158 | 1 |

FIG. 8

DIRECTORY DIALING PLAN TABLE 801 FOR NODE 106

| TEL # | NODE # | OWNERSHIP | STATUS |
|---|---|---|---|
| 3XXX | 102 | 1 | 1 |

LEVEL 5 ROUTING TABLE 802 FOR NODE 106

| TEL # | NODE |
|---|---|
| 1XXX | 101 |
| 3XXX | 106 |
| XXXX | 102 |

LEVEL 4 ROUTING TABLE 803 FOR NODE 106

| NODE # | LDC OF | # OF HOPS |
|---|---|---|
| 102 | 161 | 1 |
| 101 | 161 | 2 |

DIRECTORY DIALING PLAN TABLE 804 FOR NODE 105

| TEL # | NODE # | OWNERSHIP | STATUS |
|---|---|---|---|
| 10XX | 101 | 2 | 1 |

LEVEL 5 ROUTING TABLE 805 FOR NODE 105

| TEL # | NODE |
|---|---|
| 10XX | 105 |
| 1XXX | 101 |
| XXXX | 102 |

LEVEL 4 ROUTING TABLE 806 FOR NODE 105

| NODE # | LDC OF | # OF HOPS |
|---|---|---|
| 102 | 165 | 1 |
| 101 | 151 | 1 |

FIG. 10

SECONDARY DIALING PLAN TABLE 1001 FOR NODE 101

| TEL # | NODE # | OWNERSHIP | STATUS |
|---|---|---|---|
| 1010 S12XX | 104 | 1 | 1 |
| S1102 | 105 | 1 | 1 |

LEVEL 5 ROUTING TABLE 1002 FOR NODE 101

| TEL # | NODE |
|---|---|
| S12XX | 101 |
| 1011 S1102 | 101 |
| 1013 S11XX | 105 |
| 1012 S1XXX | 104 |

LEVEL 4 ROUTING TABLE 1003 FOR NODE 101

| NODE # | LDC OF | # OF HOPS |
|---|---|---|
| 102 | 150 | 1 |
| 104 | 155 | 1 |
| 105 | 151 | 1 |

SECONDARY DIALING PLAN TABLE 1004 FOR NODE 109

| TEL # | NODE # | OWNERSHIP | STATUS |
|---|---|---|---|
| S10XX | 104 | 1 | 1 |

LEVEL 5 ROUTING TABLE 1005 FOR NODE 109

| TEL # | NODE |
|---|---|
| S10XX | 109 |
| S1XXX | 104 |

LEVEL 4 ROUTING TABLE 1006 FOR NODE 109

| NODE # | LDC OF | # OF HOPS |
|---|---|---|
| 104 | 158 | 1 |

FIG. 9

SECONDARY DIALING PLAN TABLE 901 FOR NODE 102

| TEL # | NODE # | OWNERSHIP | STATUS |
|---|---|---|---|
| S1XXX | 104 | 2 | 1 |
| S2XXX | 106 | 2 | 1 |
| SXXXX | NMS | 1 | 1 |

LEVEL 5 ROUTING TABLE 902 FOR NODE 102

| TEL # | NODE |
|---|---|
| S1XXX | 104 |
| S2XXX | 106 |

LEVEL 4 ROUTING TABLE 903 FOR NODE 102

| NODE # | LDC OF | # OF HOPS |
|---|---|---|
| 101 | 150 | 1 |
| 106 | 160 | 1 |
| 104 | 150 | 2 |

SECONDARY DIALING PLAN TABLE 904 FOR NODE 105

| TEL # | NODE # | OWNERSHIP | STATUS |
|---|---|---|---|
| S11XX | 104 | 1 | 1 |
| S1102 | 101 | 2 | 1 |

(915)

LEVEL 5 ROUTING TABLE 905 FOR NODE 105

| TEL # | NODE |
|---|---|
| S11XX | 105 |
| S1XXX | 104 |
| S1102 | 101 |

(916)

LEVEL 4 ROUTING TABLE 906 FOR NODE 105

| NODE # | LDC OF | # OF HOPS |
|---|---|---|
| 101 | 151 | 1 |
| 101 | 165 | 2 |
| 104 | 151 | 2 |

SECONDARY DIALING PLAN TABLE 907 FOR NODE 104

| TEL # | NODE # | OWNERSHIP | STATUS |
|---|---|---|---|
| S10XX | 109 | 2 | 1 |
| S11XX | 105 | 2 | 1 |
| S12XX | 101 | 2 | 1 |
| SXXXX | 102 | 1 | 1 |

LEVEL 5 ROUTING TABLE 908 FOR NODE 104

| TEL # | NODE |
|---|---|
| S10XX | 109 |
| S11XX | 105 |
| S12XX | 101 |
| S1XXX | 104 |

(917)

LEVEL 4 ROUTING TABLE 909 FOR NODE 104

| NODE # | LDC OF | # OF HOPS |
|---|---|---|
| 101 | 155 | 1 |
| 102 | 155 | 2 |
| 105 | 155 | 2 |
| 109 | 158 | 1 |

(918)

SECONDARY DIALING PLAN TABLE 910 FOR NODE 106

| TEL # | NODE # | OWNERSHIP | STATUS |
|---|---|---|---|
| S2XXX | 102 | 1 | 1 |

LEVEL 5 ROUTING TABLE 911 FOR NODE 106

| TEL # | NODE |
|---|---|
| S2XXX | 106 |
| SXXXX | 102 |

LEVEL 4 ROUTING TABLE 912 FOR NODE 106

| NODE # | LDC OF | # OF HOPS |
|---|---|---|
| 101 | 161 | 2 |
| 102 | 161 | 1 |

FIG. 11

DIRECTORY NUMBER MANAGEMENT TABLE 1101

| DIRECTORY NUMBER | SECONDARY NUMBER |
|---|---|
| 1101 | S1102 |
| 1101 | S1101 |

FIG. 12

SECONDARY DIALING PLAN TABLE 1201 FOR NODE 105

| TEL # | NODE # | OWNERSHIP | STATUS |
|---|---|---|---|
| S11XX | 104 | 1 | 1 |
| S1102 | 106 | 1 | 1 |

LEVEL 5 ROUTING TABLE 1202 FOR NODE 105

| TEL # | NODE |
|---|---|
| S11XX | 105 |
| S1XXX | 104 |
| S1102 | 101 |

LEVEL 4 ROUTING TABLE 1203 FOR NODE 105

| NODE # | LDC OF | # OF HOPS |
|---|---|---|
| 101 | 151 | 1 |
| 101 | 165 | 1 |
| 104 | 151 | 2 |
| 106 | 165 | 2 |

SECONDARY DIALING PLAN TABLE 1204 FOR NODE 106

| TEL # | NODE # | OWNERSHIP | STATUS |
|---|---|---|---|
| S2XXX | 102 | 1 | 1 |
| S1102 | 105 | 1 | 1 |

LEVEL 5 ROUTING TABLE 1205 FOR NODE 106

| TEL # | NODE |
|---|---|
| S1102 | 106 |
| S11XX | 105 |
| S12XX | 101 |
| S1XXX | 104 |

LEVEL 4 ROUTING TABLE 1206 FOR NODE 106

| NODE # | LDC OF | # OF HOPS |
|---|---|---|
| 101 | 161 | 2 |
| 102 | 161 | 1 |
| 104 | 161 | 3 |
| 105 | 161 | 2 |

5,598,458

TELECOMMUNICATION SWITCHING SYSTEM HAVING TRANSPARENT WIRELESS FEATURES

This application is a continuation of application Ser. No. 07/995,417, filed on Dec. 18, 1992, now abandoned.

TECHNICAL FIELD

This invention relates to a telecommunication switching system and, in particular, to the providing of transparent wireless features on such a telecommunications switching system.

BACKGROUND OF THE INVENTION

In prior art telecommunication switching systems providing wireless service for wireless mobile units, a user is required to have a telephone number for the wireless mobile unit and a telephone number for the stationary telephone station set used by the user. Within the wireless prior art, it is known to be able to go from one geographical area to another geographical area and to be able to register a mobile unit in both geographical areas.

The problems in the prior art are as follows. First, the need to have distinct telephone numbers for the mobile unit and for the station telephone station set. Second, there is no coordination between the features provided on the stationary telephone station set and the mobile unit; nor, can one unit control the manner in which telephone features are provided to the other unit. Finally, many features are originating directory number or location sensitive. Calling party display is an example of a feature that is originating directory number sensitive. Call coverage is an example of a feature that is location sensitive.

SUMMARY OF THE INVENTION

The foregoing problems are solved, and a technical advance is achieved by an apparatus and method that use a software application program to serve as a termination point for all incoming calls directed to a directory number and to determine the operations that should be performed with respect to a mobile unit and a telephone station set assigned to at directory number. The software application program then directs the incoming calls to the mobile unit and telephone station set regardless of where these units connect into a telecommunication system. An outgoing call from the mobile unit or telephone station set is switched to the software application program which then switches the outgoing call to the destination telephone station set as if the outgoing call had originated at the location of the software application program. Also, the originating directory number used in placing the outgoing call is the directory number associated with the software application program.

Advantageously, the apparatus and method utilize two dialing number plans: the directory number plan which consists of standard telephone numbers and a secondary dialing plan. The secondary dialing plan is utilized by the software application program to direct and receive calls from the mobile unit and the telephone station set.

A telecommunication system for implementing the invention comprises a plurality of switching nodes each of which may be in a different geographical location. Each switching node is responsive to the mobile unit identifying itself to communicate the location of the mobile unit to the software application program and to automatically provide the features associated with the directory number served by the software application program to the mobile unit. A call directed to the directory number of the software application program can alert both the mobile unit and the telephone station set under control of the software application program. When either the station set or the mobile unit is answered, the alerting ceases on the other unit.

Other and further aspects of the present invention will become apparent during the course of the following description and by reference to the accompanying drawing.

BRIEF DESCRIPTION OF THE DRAWINGS

FIGS. 7 through 10 illustrate the dialing plan and routing tables utilized by the telecommunication switching system of FIG. 1;

FIG. 11 illustrates a directory number management table;

FIG. 12 illustrates dialing plan and routing tables utilized by the telecommunication switching system of FIG. 1.

DETAILED DESCRIPTION

Figure 1:
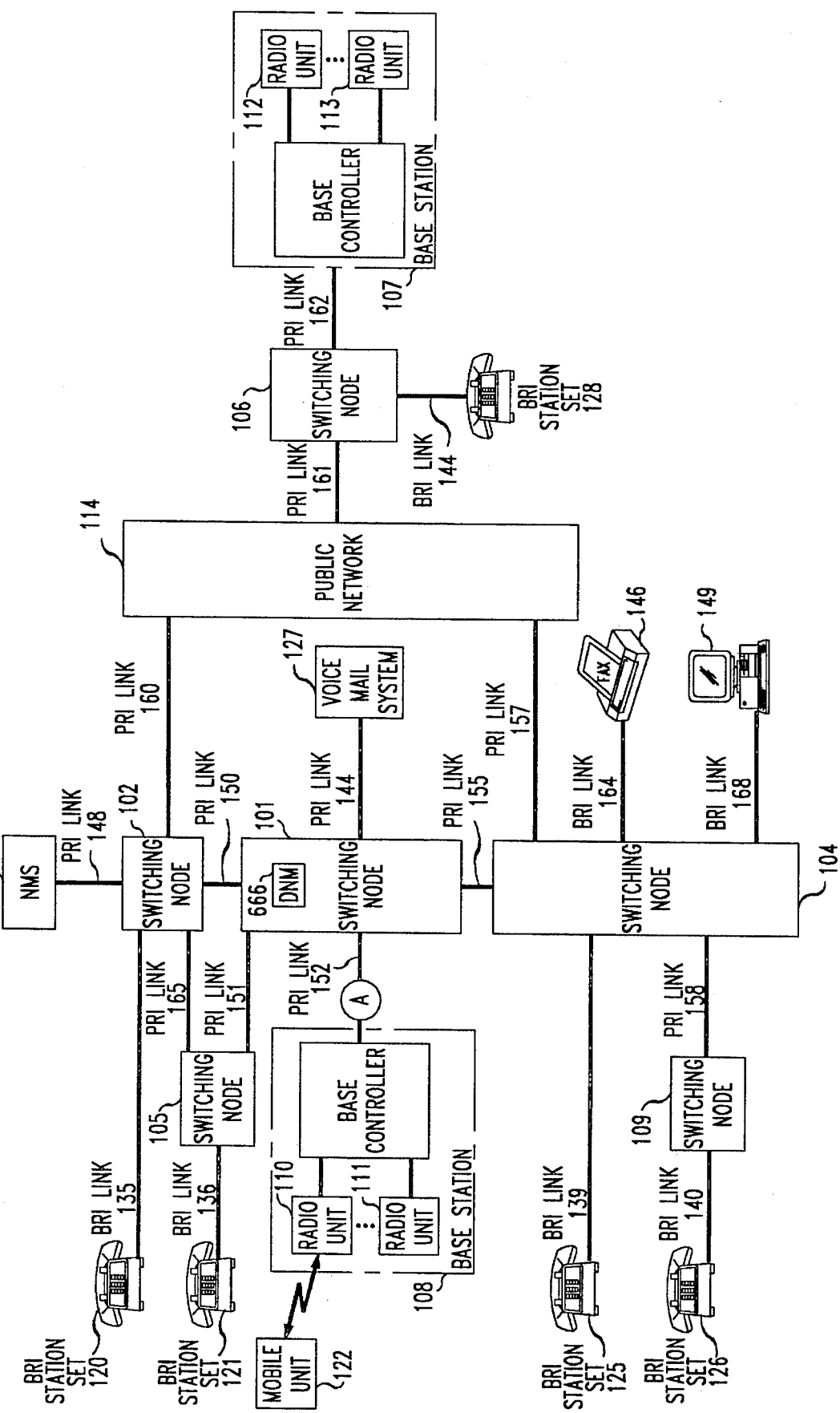
FIG. 1 illustrates, in block diagram form, a telecommunication switching system embodying the inventive concept.

FIG. 1 shows a telecommunication switching system having a plurality of switching nodes 101 through 109 with a network management system (NMS) 115. Each of the switching nodes 101 through 109 provides communication for a plurality of telecommunication terminals such as BRI station sets 120 through 130. In addition, the telecommunication system provides wireless service to mobile units such as mobile unit 122 via base stations 107 and 108 interconnected to switching node 106 and 101, respectively. Advantageously, the switching nodes of FIG. 1 function as an integrated system to provide telecommunication services such as those provided by an individual or network of AT&T Definity Generic II communication systems. Switching node 106 is interconnected to the other switching nodes via public network 114 and is providing telecommunication services to a group of people who are geographically remote from the people served by the other switching nodes. In accordance with the invention, the telecommunication system has a directory (primary) dialing plan and a secondary dialing plan. Further, in accordance with the invention, a mobile unit and station set can be paired together and share the same directory telephone number. Other mobile units and station sets each have an individually assigned directory telephone number and the switching nodes route calls to each on the basis of the assigned directory telephone number. A call to a paired mobile unit and station having a shared directory telephone number (also referred to as the primary telephone number) is first routed to a directory number management application. Depending on the feature invoked by the call, the directory number management application can route the call to either the mobile unit or station set or both using individual secondary numbers to route to the mobile unit and station set.

Further to provide feature transparency for a single mobile unit across a plurality of switching nodes geographically distributed, the directory telephone number of a mobile unit is assigned to a directory number management application which receives all calls routed to this directory number and communicates with the mobile unit via a secondary number assigned to that mobile unit. This allows the mobile unit to function as if it was directly connected to the switching node executing the directory number manager with respect to features. Hence, the mobile unit can be moved across the country and still appear to the user of the mobile unit to be connected to the local switching node.

Unlike a prior art system of switching nodes such as a network of Definity Generic II communication systems, a switching node of FIG. 1 has no predefined stored information defining how this system is configured before initialization, with what telecommunication links are terminated on which nodes, what interfaces are utilized to terminate those links, the physical configuration of the switching nodes, and the type and features of the station sets. Further, there is no predefined information setting forth the two dialing plans which are utilized to identify the telecommunication terminal equipment connected to each of the switching nodes. Finally, each switching node has no predefined knowledge of what telecommunication terminals are connected to it.

Figure 2:
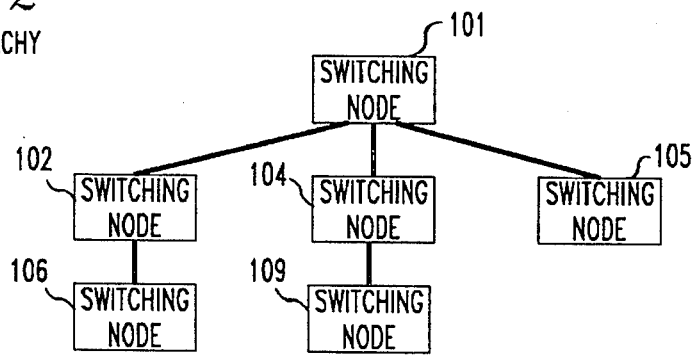
FIG. 2 illustrates the node hierarchy of the switching nodes of FIG. 1.
Figure 3:
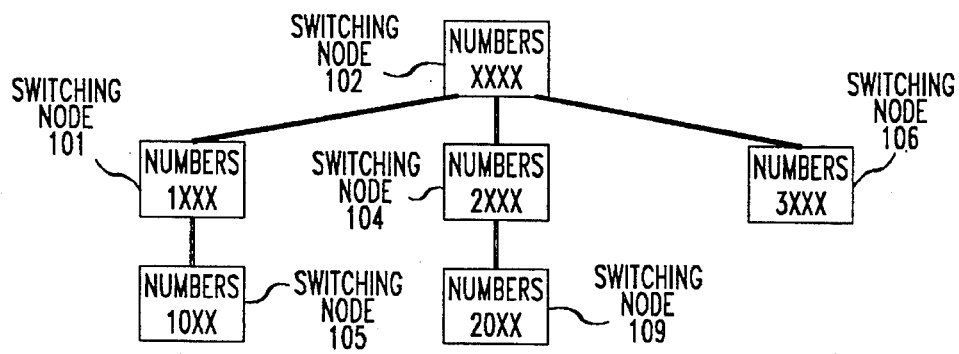
FIG. 3 illustrates the directory dialing plan hierarchy of the switching nodes of FIG. 1.
Figure 4:
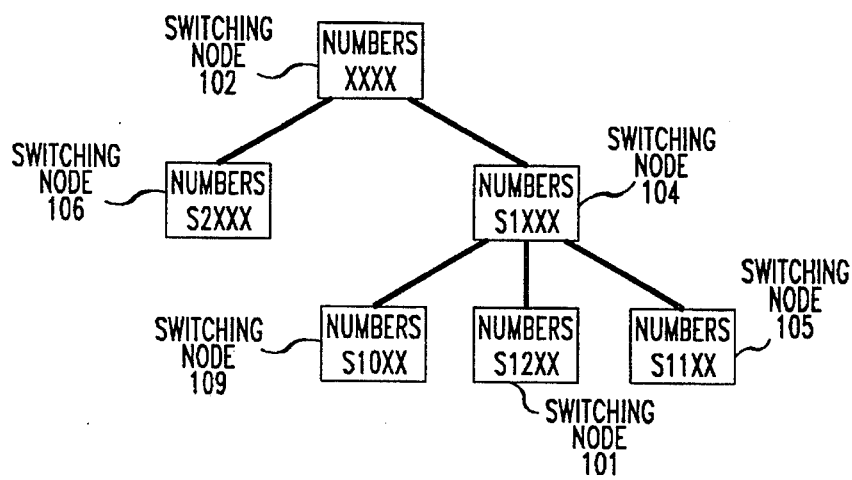
FIG. 4 illustrates the secondary dialing plan hierarchy of the switching nodes of FIG. 1.

Each switching node determines the above information upon the entire system being initialized or an individual switching node being initialized or the initialization of a new telephone communication terminal. In addition, an individual switching node begins to determine new paths through the system upon an individual telecommunication link becoming active after the switching node has been initialized. To obtain this information, each switching node as it becomes active must perform the following functions: (1) establish its own internal configuration, (2) identify and initialize interfaces, (3) establish its position in the switching node hierarchy, (4) obtain ownership for its portion of the primary dialing plan, and (5) learn how to route calls through the systems. In addition, NMS 115 must establish a call to each switching node in order to distribute the primary and among the switching nodes and to provide other management functions. Each of these functions is described in the U.S. Patent Application of B. M. Bales, et al. "Automatic Initialization of a Distributed Telecommunication System", Ser. No. 07/816,360, filed on Dec. 30, 1991, assigned to the same assignee as the present application, and hereby incorporated by reference. This patent application is now U.S. Pat. No. 5,386,466. FIG 2 illustrates the switching node hierarchy, FIG. 3 illustrates the directory/primary dialing plan hierarchy, and FIG. 4 illustrates the secondary dialing plan hierarchy.

Consider now in general terms those operations that must be performed in order to implement the present invention during initialization. These functions are (1) activation of the directory number manager, (2) identifying within the directory dialing plan the directory number used by the directory number manager, (3) obtaining ownership of a portion of the secondary dialing plan by each switching node, (4) initializing and identifying telecommunication terminals using a shared number, (5) identifying the telecommunication terminals utilizing the secondary dialing plan to their associated directory number managers, and (6) learning how to route calls through the system utilizing the secondary dialing plan and routing information associated with the switching node and directory dialing plan hierarchies. To illustrate how these functions are performed, consider the following example where mobile unit 122 and basic rate interface (BRI) station set 121 of FIG. 1 share a directory number whose directory number manager is executing on switching node 101.

To accomplish the first function (activation of the directory number manager by NMS 115). During the initialization of the system illustrated in FIG. 1, NMS 115 learned a route to switching node 101 in order to distribute the directory dialing plan. NMS 115 now transmits control information to switching node 101 over the same route activating the execution of directory number manager 666.

In order to accomplish the second function (identifying the directory number used by the directory number management application to the directory dialing plan), directory number manager 666 executing on node 101 informs the dialing plan application of node 101 that the directory number management application will be using number 1101. Since switching node 101 owns the block of number 11XX as illustrated in FIG. 3, the dialing plan application records that this number is associated with directory number manager 666.

Consider now how the third function (obtaining ownership of a portion of the secondary dialing plan by a switching node). As for the directory dialing plan, NMS 115 must first inform each switching node its portion of the secondary dialing plan. Upon being notified that it should own a certain block of secondary numbers each switching node finds its superior switching node in the dialing plan hierarchy by placing a call to its superior switching node and asks permission from the superior switching node to own that block of numbers. For example, switching node 104 is informed by NMS 115 that switching node 104 is to own the block of numbers "S1XXX" and is also informed that switching node 102 is higher in the secondary dialing plan hierarchy as illustrated in FIG. 4. During establishment of switching node 104's position in the directory dialing plan hierarchy and in the switching node hierarchy, switching node 104 gained sufficient information to route a call to switching node 102. By placing a call, the dialing plan application of switching node 104 requests from the dialing plan application of switching node of 102 permission to own the block of secondary numbers "S1XXX". Similarly, the other switching nodes in FIG. 1 obtain permission to own blocks of the secondary dialing plan.

The fourth function that is to be performed is the initialization and identification of the telecommunication terminals using a shared number. In the present example, mobile unit 122 and BRI station set 121 are sharing the directory number which is controlled by directory number manager on switching node 101. The fourth function is an extension of the function identified as function (2) as set forth in the above incorporated application. With respect to BRI station set 121, BRI station set 121 comes up in the normal manner and establishes with switching node 105 low level ISDN communication over BRI link 136. BRI station set 121 is communicating with a terminal management application in switching node 105. BRI station set 121 identifies itself to the terminal management application during the terminal end identifier (TEI) assignment procedure. As part of the procedure, the terminal management application requests the service profile ID (SPID) information from BRI station set 121. The SPID information identifies the terminal service profile (TSP) which defines the directory number plus features of the station set. In the case of a station set which has a solo directory number, the SPID information must be verified with the dialing plan application of the node with respect to the assignment of the directory number. In turn, the terminal management application must receive the service profile information from the system network management application in NMS 115. When a station set is sharing a directory number, the service profile information identifies that there is a shared directory number and defines that number. In addition, the terminal service profile information provides the secondary number which is being used by this station set. In the present example, BRI station set 121 is assigned the secondary number of "S1101". The terminal management application running in switching node 105 to which BRI station set 121 is connected, requests that the dialing plan application in switching node 105 verify that the secondary number of "S1101" can be used. From FIG. 4 it can be seen that switching node 105 owns the block of numbers "S11XX". Hence, the terminal management application receives permission for BRI station set 121 to utilize this secondary number.

To perform the fifth function (identifying the telecommunication terminals having a shared directory number to their directory number management application), the terminal management application controlling BRI station set 121 must identify this station set to directory number management application 666 in switching node 101 which is controlling the shared number. This is accomplished by the terminal management application placing a call to the directory number management application. This call is placed utilizing the shared directory number 1101, and is easily routed to switching node 1012. From FIG. 3, it is seen that switching node 105 is aware of the numbers controlled by switching node 101; and from the node hierarchy illustrated in FIG. 2, switching node 105 realizes that it is directly attached to switching node 101. Once the call has been established, the terminal management application transmits the secondary number of BRI station set 121 along with information defining the route to directory number management application 666. Directory number management application 666 records the fact that BRI station set 121 is sharing directory number 1101. Also, lower software layers in switching node 101 record the route information.

The sixth function (learning how to route using secondary dialing plan) was accomplished by the fifth function. During performance of the fifth function, each telecommunication terminal sharing a directory number places a call via the terminal management application to the directory number management application and includes information on how to reach that terminal management application via the secondary numbering plan. There is never a problem for the directory number management application in routing information back to a terminal management application since that route is defined by the initial call from the terminal management application.

Consider now how mobile unit 122 performs the above six functions. When mobile unit 122 registers with base station 108 via radio unit 110, mobile unit 122 performs the TEI assignment procedure in the same manner as BRI station set 121. A terminal management application in switching node 101 is responsive to the SPID information from mobile unit 122 to obtain the terminal service profile information. From this information, the terminal management application identifies the fact that mobile unit 122 is sharing directory number 1101 controlled by directory number management application 666 in switching node 101. The terminal management application then informs directory number application 666 of the existence of mobile unit 122 and how to route to this particular terminal application program. The manner in which a switching node controls a mobile unit and a base station is set forth in the U.S. Patent Application of C. Y. Farwell, et al., "Prioritizing a Multiple Access Channel in a Wireless Telephone System", Case 4-2-3, filed on Sep. 30, 1992 and assigned to the same assignee as the present application. In addition, the terminal management application provides to directory number management application 666 the secondary number of mobile unit 122 which is "S1102". Also, the terminal management application requests that the dialing plan application of switching node 101 receive permission to utilize the secondary number "S1102". The dialing plan application requests from the dialing plan application of switching node 105 permission to "host" the number "S1102". Since as can be observed from FIG. 4, switching node 105 owns the block of secondary numbers "S11XX". The process of requesting permission to host a number allows the dialing plan application of switching node 101 to utilize this number. The previously incorporated patent application defines the process of hosting a number.

In conclusion, within the present example, both telecommunication terminals which are sharing shared directory number 1101 have identified themselves to directory number management application 666 which is controlling that directory number. In addition, the directory number management application 666 has information on how to route calls to these two telecommunication terminals utilizing secondary numbers.

Consider now the transparency of features as mobile unit 122 is transferred from one base station to another. This transparency is given with respect to four features which are as follows: send-all-calls, call coverage, message recovery from voice mail system 127, and message waiting lamp functions. Switching nodes 101 through 105 and switching node 109 are assumed to be in one geographical location. When BRI station set 126 places a call via switching nodes 104 and 109 to the shared directory number, the directory number management application is responsive to this call to send call setup messages to BRI station set 121 and mobile unit 122 utilizing their respective secondary numbers. It is assumed for the sake of this example, that BRI station set 121 represents the user's telephone set in either his/her office or home and that mobile unit 122 is utilized by the user when he/she is away from his/her office or home. The send-all-calls feature is implemented in the following manner. If the send-all-calls button is actuated on BRI station set 121, BRI station set 121 does not provide an alerting indication; however, mobile unit 122 does provide an alerting indication unless the send-all-calls button has been actuated on this mobile unit. If the send-all-calls button is also actuated on mobile unit 122, then BRI station set 121 and mobile unit 122 do not provide alerting indications except for a momentary ring before the call is transferred to call coverage.

In the present example, the call coverage path is assumed to be only voice mail system 127. However, the call coverage path could include other telephone sets. Upon actuation of the send-all-calls button in mobile unit 122, the directory number management application directs the call to voice mail system 127 and provides to voice mail system 127 the shared directory number as the intended destination of the transferred call. Voice mail system 127 then proceeds to respond to the call in a normal manner. Also, if neither BRI station set 121 or mobile unit 122 answering the call after some predefined period, the call will be directed to call coverage.

After responding to the call intended for the shared directory number, voice mail system 127 transmits to directory number management application the message defining that there is a message waiting on voice mail system 127 for this directory number. (The message is directed to the shared directory number.) The directory number management application is responsive to this message to transmit to the terminal management applications controlling BRI station set 121 and mobile unit 122 (utilizing the secondary dialing plan) messages indicating that a message is waiting. These telecommunication terminals respond to these messages by actuating a visual indicator on each terminal.

The user can obtain the message from the voice mail system 127 by using either mobile unit 122 or BRI station set 121. Both telecommunication terminals have a automatic dial button which when actuated transmits the extension number on switching node 101 for voice mail system 127 to the directory number management application. The directory number management application is responsive to this signal to set up a connection between the telecommunication terminals and voice mail system 127. Indeed, any call that is dialed by either BRI station set 121 or mobile unit 122 is first directed to directory number management application; and then, the call is placed by that application so that the receiving station set receives the shared directory telephone number as the caller ID.

Consider now when the user of mobile unit 122 travels to the location of switching node 106. When mobile unit 122 disconnects from radio unit 110, base station 108 informs the terminal management application in switching node 101 which removes all records of mobile unit 122 maintained in switching node 101 including records maintained by the directory number management application. Switching node 106 is interconnected to the other switching nodes via public network 114. The manner in which this interconnection is performed is described in detail in the above incorporated patent application. When arriving at the site of switching node 106, the user activates the registration procedure via mobile unit 122. One of the radio units 112 through 113 of base station 107 responds to this registration request. As before, the TEl assignment procedure is performed but this time on switching node 106. A terminal management application in switching node 106 is responsive to this procedure to obtain the terminal service profile which includes the shared directory number, the secondary telephone number, and the features of the mobile unit. The terminal management application in switching node 106 then places a call to the directory number management application in switching node 101. This call is routed utilizing the directory dialing plan, which is well established at this point in time. The terminal management application informs the directory number management application of the existence of mobile unit 122 and that its secondary number is "S1102". The terminal management application in switching node 106 requests that the dialing plan application of switching node 106 requests permission from the dialing plan application of switching node 101 to host the secondary number of mobile unit 122, since that secondary number is in a block owned by switching node 101. The operation of the four features is as before since the directory number management application simply routes the calls and messages to mobile unit 122 via switching node 106. The user of mobile unit 122 detects no difference in the operation of these features.

Software Architecture

Figure 5:
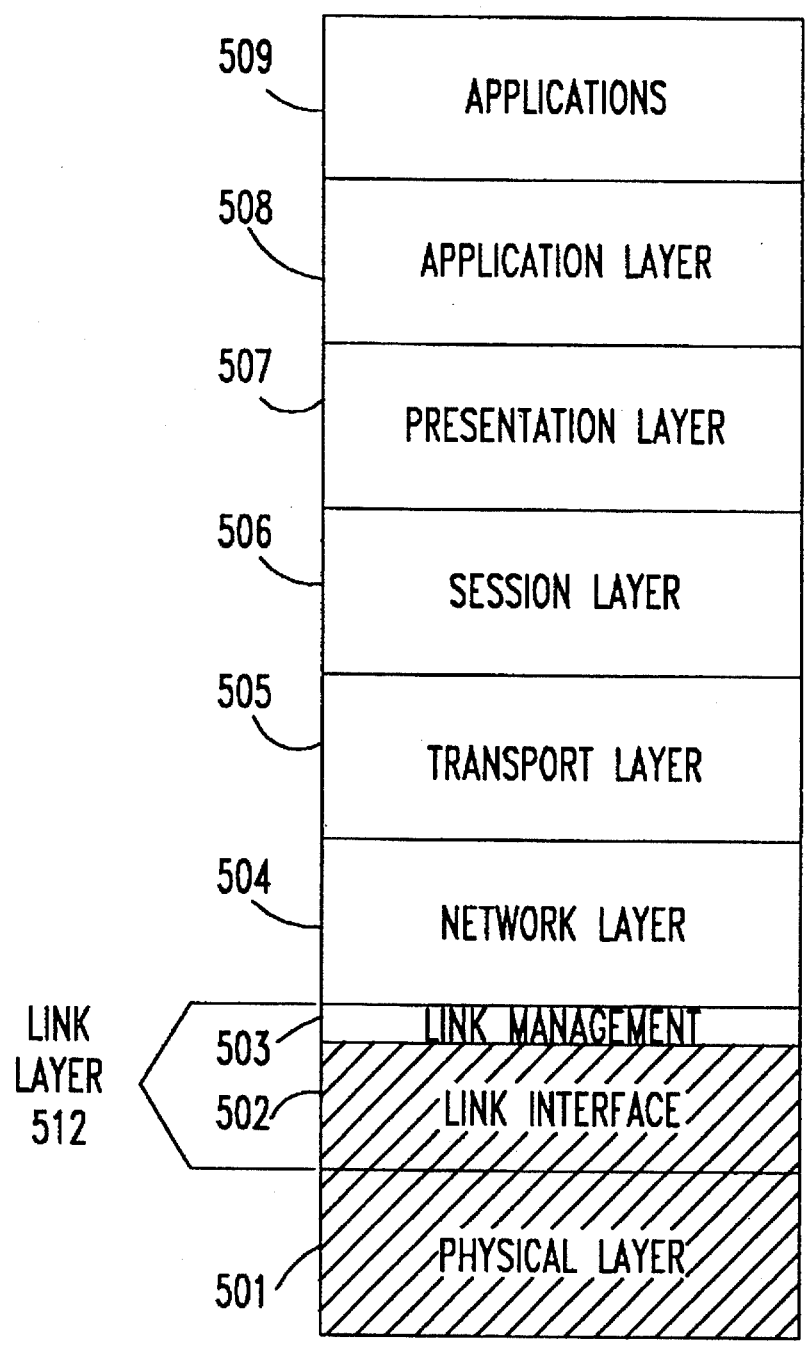
FIG. 5 illustrates the software architecture implemented in each of the switching nodes.

FIG. 5 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 501 is to terminate physical links. Specifically, physical layer 501 is responsible for maintaining physical channels and for controlling physical subchannels thereon. Physical layer 501 comprises a software portion and physical interfaces. Further, the software portion of physical layer 501 is responsible for the direct control of the physical interfaces to which physical links communicating PRI and BRI information terminate. Physical layer 501 presents to link layer 512 physical subchannels and physical channels as entities controllable by link layer 512.

The primary function of link layer 512 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 512 and physical layer 501. (An example of this type of protocol is the LAPD packet protocol used in ISDN Q.921. In the ISDN standard, link layer 512 terminates the LAPD protocol.) Link layer 512 can support multiple protocols so that the upper layers are uneffected by the different protocols being utilized. Further, link layer 512 allows higher software layers to control physical layer 501 in an abstract manner.

As seen in FIG. 5, link layer 512 is divided into link interface 502 and link management 503. The reason for this division is set forth herein below. It will be helpful at this point to discuss the communication of ISDN signals over a D channel to help readers, for example, who have only a rudimentary knowledge of the communication of ISDN signals over a D channel. At link layer 512, a plurality of logical links is established on each D channel. One of these logical links communicates ISDN control signals to each endpoint, and each call control logical link is referred to herein as a logical D channel (LDC). The LDC is identified by a logical D channel number (LDCN).

Link interface 502 does the majority of the functions performed by link layer 512, including the establishment of the logical links. Link management 503 identifies the various link interfaces for higher software layers. Further, link management communicates information between the logical links and higher software layers.

Network layer 504 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 504 of switching node 101 negotiates with its peer layer (the corresponding network layer 504 in switching node 102) in order to obtain allocation of a B channel in PRI link 150—a procedure later to be repeated if a second B channel is desired. This negotiation is carried out using standard ISDN Q.931 messages such as the call setup and connection messages via the LDC setup on the D channel of PRI link 150. Network layer 504 identifies all B channels of a given interface with the LDC for that interface. Network layer 504 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 504 receives information from another node concerning a call via a LDC. As information is received on the LDC, a call reference number is utilized to identify the call associated with this message. The call reference number is selected by the originating network layer during call setup in accordance with the ISDN standard.

Transport layer 505, is the key element that allows the routing of a call through a complex system having multiple nodes as illustrated in FIG. 1. Its primary function is to manage the routing of calls externally, i.e., between switching nodes. Transport layer 505 views the system of FIG. 1 in terms of nodes and is concerned with routing calls from its own node to other nodes or endpoints. (As explained in the detailed discussion of session layer 506, that layer, not transport layer 505, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing layer 3 and signaling paths (LDCs) established between switching nodes.

With respect to inter-node routing, transport layer 505 is the first layer that starts to take a global view of the overall system illustrated in FIG. 1. Transport layer 505 uses information provided by session layer 506 to select the inter-node path. The transport layer performs its task of routing between various nodes by the utilization of tables defining the available paths and the options on those paths. These tables do not define all paths but only those paths which the node has already used.

Communication between transport layers is done by network layer 504 using established LDCs. Transport layer 505 communicates information destined for its peers to network layer 504, and network layer 504 packages this information within the information elements, IEs, of standard ISDN Q.931 messages. Network layer 504 uses the LDC that has been setup to a particular node to communicate this information to its peer network layer. Similarly, when another network layer receives information of this type, the other network layer unpackages information and then directs the information to the transport layer.

The primary function of session layer 506 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 506 any time two applications require communication with each other. As noted earlier, session layer 506 deals only in temps of switching nodes and applications on those switching nodes and relies on transport layer 505 to establish paths to other switching nodes. Session layer 506 identifies the called application by an address which previously in the telecommunication art was thought of as only a telephone number but has a much broader concept in the Q.931 protocol. From this address, session layer 506 determines the destination switching node. Session layer 506 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 507 of FIG. 5 invokes a complex protocol in order to groom the information being communicated between applications so that the applications are totally divorced from the protocol used to communicate the information. A presentation level protocol allows an application to communicate with a peer application across a transport path.

Finally, application layer 508 manages the resources needed by the applications running at software layer 509. When an application at software layer 509 is communicating with another peer application, the application is unaware of how many other applications exist or where these other applications are located. It is the function of application layer 508 to determine and use such details, consequently allowing the applications to be written in a very abstract manner. At applications layer 509, thus far six applications have been discussed: the system management, dialing plan, terminal management, connection manager, directory number management, and call applications.

Figure 6:
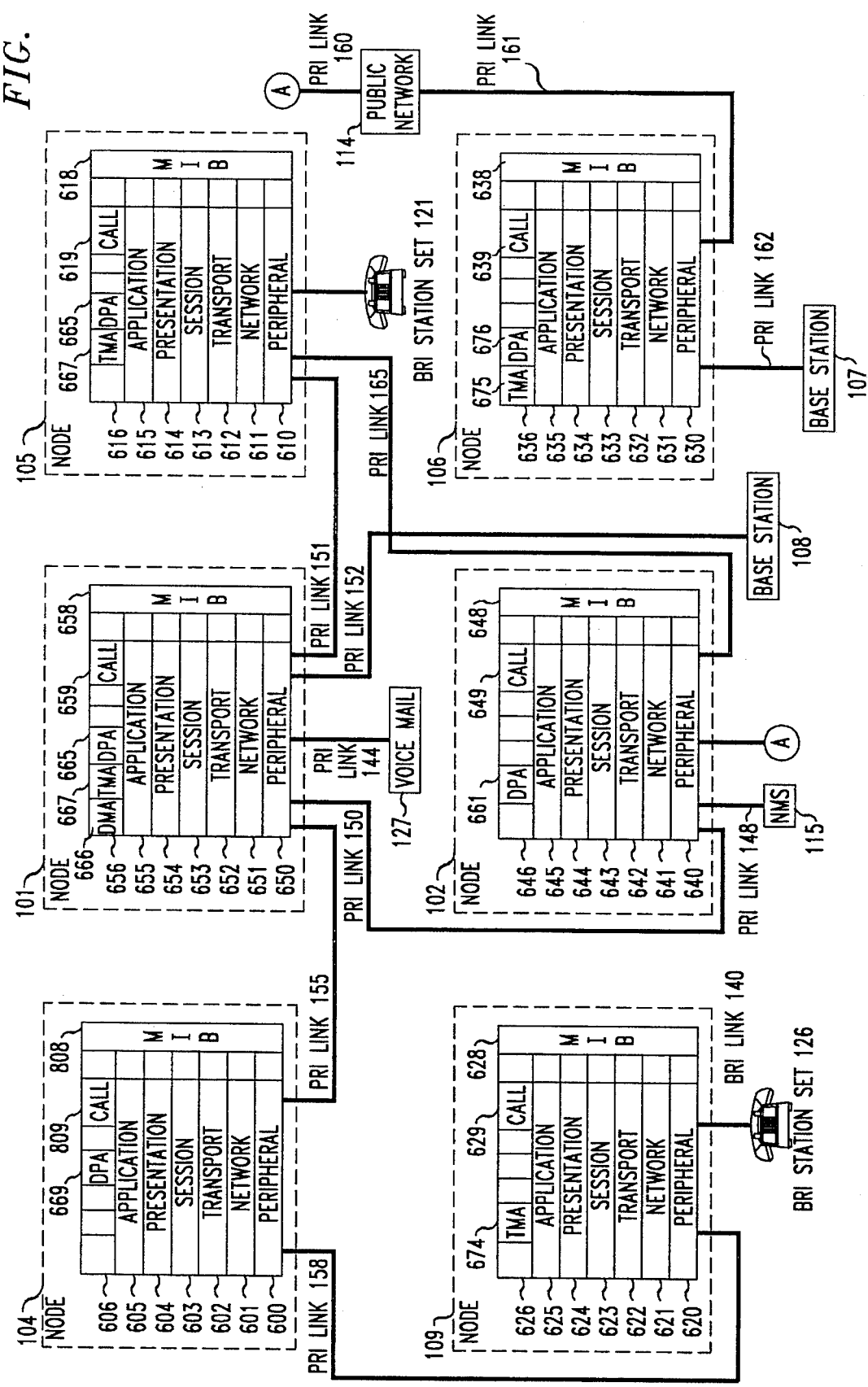
FIG. 6 illustrates in greater detail the telecommunication switching system of FIG. 1.

The manner in which this software architecture is implemented on switching nodes with respect to physical hardware is disclosed in the above-incorporated patent application. FIG. 6 illustrates a software representation of FIG. 1. The elements labeled "peripheral" such as peripheral 640 implement the functions of physical interfaces and networks.

A brief description is given of how a standard ISDN link is initialized with respect to the software layers. During the previous discussion of link interface layer 502 and physical layer 501 of FIG. 5, it was described how these two layers function together to establish logical links on packetized ISDN D or B channels. Link management software layer 503 identifies these logical links and communicates information to or from one of the logical links with any designated higher software layer. The destination of the higher software layer occurs when the logical link is initialized. For example on a D channel of a standard ISDN link, one specific logical link (referred to as a logical D channel, LDC) is always communicated to network software layer 504 in accordance with the ISDN specification. The LDC communicates all call control information for the B channels of the standard ISDN link and is an integral part of the ISDN specification.

Consider the initialization of a standard ISDN link. When a standard ISDN link becomes active, the physical layer identifies the physical interface number of that link to the link interface software layer. The link interface software layer uses the packet protocol on the D channel to identify what is on the other side of the interface by communicating over a pre-specified logical link of the D channel. The link interface software layer then informs the link management software layer that a new interface is active, that it has a certain number of B channels, and identifies to what the new interface is connected (if possible). The link management software layer informs the network software layer that a new interface is active and that it contains a certain number of B channels.

In response, the network software layer records the new interface's existence and sets up tables to control the B channels. If call control signaling has not previously been established with the other side over a different interface, the network software layer assigns an LDC record to the interface and requests that the link management layer establish a signaling logical link with the other side. This request is passed to the link interface layer which uses the link access protocol-D channel (LAP-0) protocol to establish signaling. When the signaling logical link is established, the link interface layer notifies the link management layer which notifies the network software layer that call signaling is active. Finally, the network software layer informs the transport software layer that a new LDC is active and to what system entity the new LDC is connected.

After both sets of software layers (e.g. software layers 630 through 636 and software layers 640 through 646) are initialized in this manner, calls may be established over the B channels associated with the LDC by the network software layers. Signaling information received or transmitted on the LDC is communicated between the network software layer and the link management software layer. In turn, the link management software layer communicates this information with link interface software layer for communication on the logical link of the D channel. For example, PRI links 150 and 148 are established in this manner.

Network Management Initialization

NMS 115 has a similar software structure as software layers 640 through 646; however, the applications of NMS 115 are different than those in software layer 646. Once the LDC becomes active on primary rate interface (PRI) link 148, NMS 115 utilizes the system identification information received from switching node 102 to determine that NMS 115 is connected to switching node 102. Then, the system network manager application running in NMS 115 places a call to the system management application running at software layer 646 in switching node 102. The call is directed to the system management application by utilizing the node number of switching node 102 and the specific telephone number which all system management applications share. Once the call is established between the system management application and the system network manager application in NMS 115, the system network manager application requests that the system management application transfer to it from the management information base 648 information relating to physical interfaces connected to switching node 102, switching nodes to which switching node 102 is connected (such as switching node 101) and the connected terminals (such as BRI station set 120). The system network manager application in NMS 115 stores this information in the appropriate tables and analyzes it to determine the switching nodes which are interconnected to switching node 102. The routing tables of switching node 102 are illustrated in FIG. 7, which was populated during the initialization of switching node 102.

As illustrated in FIG. 6, switching node 101 is interconnected to switching node 102 via PRI link 150. NMS 115 places a call via switching node 102 and PRI link 150 to the system manager application in switching node 101. The signaling information required to establish such a call through switching node 102 is transmitted over the LDC established on the D channel of PRI link 148. These signals are commonly called a setup message. The setup message is then processed by layers 640 and 641 to present this setup message to transport layer 642. Transport software layer 642 analyzes the node number utilizing routing table 707 illustrated in FIG. 7. Transport software layer 642 determines that there exists an LDC to switching node 101 and requests that network software layer 641 transmit the setup message to switching node 101. Network software layer 641 then requests that layer 640 transmit the setup message on the established LDC for switching node 101. When the setup message arrives at transport software layer 652 after being processed by the lower software layers, software layer 652 recognizes the node number as its own and utilizes the telephone number in the setup message to establish a session between the system manager application and system network manager application in NMS 115. The session is established by transport software layer 652 requesting that a connection message be transmitted by network software layer 651 back to the network software layer 641 of switching node 102. The session being established is a logical call. Once the session has been established between the system network management application of NMS 115 and the system management application, the system network manager application requests that the system management application transfer to it from management information base 658 similar information to that which was requested from the system management application. The routing tables for switching node 101 are illustrated in FIG. 7. The system network manager application in NMS 115 performs similar functions with respect to switching nodes 103 through 112.

Dialing Plans Initializations

After the system network manager application has set up a session with each switching node, the dialing plan management application in NMS 115 requests that a session be set up to the dialing plan application of that switching node. The dialing plan management application in NMS 115 first distributes the directory dialing plan to the switching nodes and then distributes the secondary dialing plan to the switching nodes. For example, to distribute the directory dialing plan, the dialing plan management application requests that a session be set up to dialing plan application (DPA) 661 in switching node 102 of FIG. 6. When the session has been set up, the dialing plan management application gives to switching node 102 ownership of all directory telephone numbers of the system as illustrated in FIG. 3. Similarly, the dialing plan management application sets up sessions to each dialing plan application in each of the switching nodes and gives ownership to those nodes of blocks of directory telephone numbers as illustrated in FIG. 3. These sessions are set up by utilizing a setup message which is directed to the appropriate dialing plan application by use of the node number and a predefined telephone number which is common for all dialing plan applications.

A dialing plan application (such as dialing plan application 665 of switching node 101) cannot not actually own a block of numbers until it has received permission to do so from the dialing plan application which owns the block. For example, consider the case of dialing plan application 661 of switching node 102 which owns all of the directory telephone numbers and dialing plan application 665 of switching node 101 which wants to own block "1XXX". Dialing plan application 665 must request ownership of block "1XXX" from dialing plan application 661. Upon giving dialing plan application 665 permission to own that block of directory telephone numbers, dialing plan application 661 makes the entries 705, 701, and 702 on FIG. 7 indicating that these numbers have been given away to switching node 101 and updating the level 5 routing table.

The numbers in the ownership column of tables 708 and 711 of FIG. 7 have the following meaning: "1" means that a number block is owned by the node and received from the node listed in the node column, and "2" means that a number block has been given away to the node listed in the node column. The status column maintains the status of a permission request and whether a call still exits between the two dialing plan applications. A "1" means permission granted, a "2" means permission requested, and a "3" means that a call still exits between the two dialing plan applications.

The remaining switching nodes of FIG. 1 obtain ownership of their portions of the directory telephone number dialing plan as set forth in the above incorporated patent application. The resulting directory dialing plan tables, level 5 routing tables, and level 4 routing tables for each of the switching nodes is set forth in FIGS. 7 and 8.

After the directory dialing plan has been fully initialized, the dialing plan management application distributes the secondary dialing plan to each of the switching nodes as illustrated in FIG. 4. In addition, each switching node is given the node number of the switching node higher in the dialing plan hierarchy than itself. Once again, a dialing plan application cannot actually own a block of numbers until it has received permission to do so from the dialing plan application which owns that block. This function is performed in each node by the same dialing plan application which performed the function for the directory dialing plan. For example, dialing plan application 665 of switching node 101 requests ownership of the block of secondary numbers "S12XX" from dialing plan application 669 of switching node 104. When dialing plan application 669 gives ownership to dialing plan application 665, dialing plan application 669 updates secondary dialing plan table 907 of FIG. 9. Further, dialing plan application 669 also records in level 5 routing table 908 in FIG. 9 the fact that a telephone call to the block of numbers "S12XX" should be routed to switching node 101. The dialing plan applications in the remaining nodes also set up sessions with the correct dialing plan applications to receive ownership of their portions of the secondary dialing plan. The result is illustrated in FIGS. 9 and 10 with the exception of entries 917, 918, and 1010 through 1013 which are entered at a later point in time as will be described.

Finally, the system network manager application in NMS 115 transmits a message to the system manager application in switching node 101 to activate directory number manager application (DNM) 666. Further, the system network manager application also informs directory number management application 666 that it is to utilize directory telephone number "1101". Directory number management application 666 requests from dialing plan application 665 permission to utilize this number. Since switching node 101 owns the block of numbers "11XX", dialing plan application 665 gives permission to directory number management application 666 to utilize this number.

Once each node has obtained ownership of its portion of the secondary dialing plan (function 3), the fifth function can be performed (identifying the telecommunication terminals utilizing the secondary dialing plan to their associated directory number management applications). Note, that the fourth function (initializing, and identifying telecommunication terminals using a shared number) was performed during the initialization of the system. At this point in time, the terminal management applications can precede with the TEI assignment procedure. For example, terminal management application (TMA) 667 is responsive to the terminal service profile information to ascertain that mobile unit 122 is sharing a directory number (1101) and that it is utilizing secondary number "S1102".

First, terminal management application 667 requests that dialing plan application 665 obtain permission to use secondary number "S1102". Dialing plan application 665 requests that a session be setup with dialing plan application owning "S1102". In response to this request, session layer 653 examines a level 5 routing table 1002 of FIG. 10 and determines that it has no information on how to route to the switching node owning secondary number "S1102". (Note, that entries 1011 through 1013 have not been entered into table 1002 at this time) As a default, session software layers 653 routes the request for a session to switching node 104 which is higher in the secondary dialing plan hierarchy than switching node 101 as illustrated in FIG. 4. Session software layer 553 requests that transport software layer 652 attempt to set up a session with the dialing plan application owning secondary number "S1102" via switching node 104. Transport layer 652 is responsive to the request from session layer 653 to route a call to switching node 104 to examine level 4 routing table 1003 to determine that PRI link 155 is to be utilized. Transport layer 652 requests that network layer 651 transmit a set up message to establish a call with dialing plan application 669 in switching node 104.

Once the session is established, dialing plan 665 requests that dialing plan 669 give permission for dialing plan application 665 to own/host the secondary number "S1102". Dialing plan application 669 in switching node 104 is responsive to this request to interrogate secondary dialing plan table 907 of FIG. 9. From this table, dialing plan application 669 determines that the secondary number "S1102" is part of a block, "S11XX" whose ownership has been given to switching node 105. In response to this determination, dialing plan application 669 requests that call application 609 redirect the call to switching node 105. In response to this request, network layer 601 transmits back to switching node 101 a redirect message specifying that the call/session is to be directed to switching node 105. The operation of the redirect message is set forth in the above-incorporated patent application.

Transport layer 652 of switching node 101 is responsive to the redirect message to interrogate level 4 routing table 1003 of FIG. 10 to determine that PRI link 151 is to be utilized to reach switching node 105. Transport layer 652 requests that the set up message be sent to switching node 105 by network layer 651. When the set up message is received at switching node 105, it is communicated to layers 610 through 615 to dialing plan application 673. After a session has been set up between dialing plan applications 665 and 673, dialing plan application 665 requests permission to host secondary number "S1102". Dialing plan application 673 transmits back permission to dialing plan application 665 and marks tables 904 and 905 of FIG. 9 appropriately. In secondary dialing plan table 904, dialing plan application 673 inserts entry 915 which designates that secondary number "S1102" is being hosted by switching node 10 1. Entry 916 in level 5 routing table 905 for switching node 105 designates that the secondary number "S1102" can be reached by routing to switching node 101.

Upon receiving permission to host the secondary number, dialing plan application 665 updates secondary dialing plan table 1001 of FIG. 10 with entry 1010 to indicate that it now owns secondary number "S1102" and has received permission to host this number from switching node 105. Also, dialing plan application 665 updates level 5 routing table 1002 to indicate at secondary number "S1102" terminates on switching node 101.

Dialing plan application 665 then informs terminal management application 667 of the fact that switching node 101 is now hosting secondary number "S1102". Terminal management application 667 then informs directory number management application 666 that secondary number "S1102" is sharing directory number "1201". In response, directory number management application 666 makes entry 1105 into directory number management table 1101 of FIG. 11. Note, directory number management application 666 can perform the necessary operation on a number of directory numbers and their associated secondary numbers and utilizes the entries in FIG. 11 to properly associate the secondary numbers with their directory numbers.

Terminal management application 672 and dialing plan application 673 of switching node 105 perform similar operations with respect to BRI station set 121 which is utilizing secondary number "S1101". The result of these operations is insertion of entry 1106 into FIG. 11. Note, that switching node 105 owns the secondary number block "S11XX" hence dialing plan application 673 does not have to get permission to use secondary number "S1101".

Consider now how a call is set up between BRI station set 126 which is connected to switching node 109 and mobile unit 122 and BRI station set 121 which share directory number "1101". A call is routed from BRI station set 126 connected to switching node 109 to mobile unit 122 and BRI station set 121 connected to switching node 105 using the shared directory number "1101". Terminal management application 674 in switching node 109 is responsive to the setup request and dialed number (also referred to as the called number) from BRI station set 126 to request that a call be set up to the dialed number which is "1101". Session layer 623 is responsive to this request to examine level 5 routing table 1005 of FIG. 10. Session software layer 623 accesses level 5 routing table 1005 and determines that it does not know how to route the call. As a default action, session software layer 623 decides to route the call to the switching node that has the dialing plan manager for the number "nearest" the dialed number, in this case, switching node 104. Session software layer 623 then transmits down to transport software layer 622 a request to route a setup message to switching node 104.

Transport software layer 622 is responsive to this request to access level 4 routing table 1005 illustrated in FIG. 10 and to determine from this table that the LDC of PRI link 158 is to be used to access switching node 104. Transport software layer 622 then sends a request to network software layer 621 to transmit a setup message to switching node 104. A setup message includes the destination switching node number, the dialed number, and the telephone number of the caller. Network software layer 621 in conjunction with peripheral 620 transmits the setup message via PRI link 158 to switching node 104.

When the setup message is received by peripheral 600, it is transferred to software layer 602 via network software layer 601. Transport software layer 602 recognizes the node number for switching node 104 and transfers the setup message to session software layer 603. Session software layer 603 accesses level 5 routing table 908 of FIG. 9 to match the dialed number with one of the telephone numbers entered in that table. The only telephone number that matches the dialed number is entry 917 which identifies switching node 101. Session software layer 603 then requests that transport software layer 602 transmits the setup message to switching node 101 and includes the dialed telephone number and the caller telephone number.

Transport software layer 602 accesses level 4 routing table 909 of switching node 104 to find a path to switching node 101. Transport software layer 602 matches at entry 918 and determines that the route to switching node 101 is via PRI link 155. The latter software layer then formulates a request to network software layer 601 to transmit the setup message to switching node 101. Network software layer 601 transmits the setup message via PRI link 155 to switching node 101.

When the setup message is received by transport layer 652 via peripheral 650 and network software layer 651 of switching node 101, this transport software layer examines the destination switching node number and determines that it is its own. Transport software layer 652 then communicates the setup message to session layer 653. The latter software layer is responsive to the dialed number to access level 5 routing table 1002 of FIG. 10. The dialed number matches entry 1011 of FIG. 10. This entry destinates that the number can be found on switching node 101. Using other internal tables, session software layer 653 determines that this dialed number references directory number management application 666 and communicates the setup message to directory number management application 666.

Directory number management application 666 is responsive to the setup message to request that session layer 653 send setup messages to mobile unit 122 and BRI station set 121 utilizing secondary numbers "S1102" and "S1101", respectively. The setup messages include the caller information received in the setup message from BRI station set 126 and switching node 109. For mobile unit 122, session layer 653 is responsive to the request to access level 5 routing table 1002. Since the number is a secondary number, table 1002 is accessed rather than level 5 routing table 709 of FIG. 7. Upon accessing level 5 routing table 1002, session software layer 653 determines that the secondary number "S1102" terminates on switching node 101 and transfers the setup message to terminal management application 667. Terminal management application 667 then alerts mobile unit 122 via software layers 653 through 655 and base station 108. Once base station 108 is alerting mobile unit 122, base station 108 responds with an alerting message which is transferred back to directory number management application 666 via software layers 650 through 655.

With respect to the request to send a setup message to BRI station set 121, session software layer 653 is responsive to the request from directory number management application 666 to examine level 5 routing table 1002 of FIG. 10 and determines that the best match for secondary number "S1101" is entry 1012 which designates that this secondary number is part of a block of secondary numbers owned by switching node 104. In response to this determination, session software layer 653 requests that transport software layer 652 communicate the setup message to switching node 104.

In response to this request, transport software layer 652 accesses level 4 routing table 1003 and determines that the LDC to be used for routing calls to switching node 104 is that of PRI link 155. Transport software layer 652 then requests that layers 650 and 651 route the setup message to switching node 104 via PRI trunk 155.

When the setup message is routed to session software layer 613 of switching node 105 via layers 610 through 612, session software layer 613 accesses level 5 routing table 905 of FIG. 9 and determines that the secondary number "S1101" is part of a block which has been given to switching node 105. Session layer 653 then requests that transport layer transmit back to switching node 101 a redirect message redirecting a setup message to switching node 105. The transport layer 652 of switching node 101 is responsive to the redirected setup message to route this message to switching node 105 via PRI link 151 after accessing level 4 routing table 1003 of FIG. 10 which defines that PRI link 151 is to be utilized to route calls to switching node 105.

Upon receiving the setup message, transport layer 612 of switching node 105 determines that the destination switching node is switching node 105 and communicates the setup message to session layer 613. Session layer 613 is responsive to the setup message to communicate this setup message to terminal management application 652. In turn, terminal management application 672 transmits the setup message to BRI station set 121. BRI station set 121 responds with an alerting message which terminal management application 672 requests be sent back to directory number management application 666 on switching node 101.

Once directory number management application 666 has received the alerting message from either base station 108 or BRI station set 121, directory number management application 666 communicates an alerting message back to switching node 109.

Assuming now for the sake of the example, that mobile unit 122 does not answer the telephone call from BRI station set 126 but that BRI station set 121 does answer. When BRI station set 121 answers the call, switching node 105 transmits a connecting message to switching node 101 and sets up a connection between BRI link 136 and PRI link 159 via peripheral 610 of FIG. 6. When the connection message is received by switching node 101, it will be communicated to directory number management application 666. The latter application responds by setting up a connection through switching node 101 between PRI link 151 and PRI link 155 and transmitting a connection message to switching node 109 via switching node 104. This connection message causes connections to be set up through switching nodes 104 and 109. Switching node 109 responds with a connection acknowledge message which is relayed back to directory number management application 666. At this time, there is a talk path between BRI station 121 and BRI station set 126.

In response to the connection acknowledge message, directory number management application 666 transmits a connection acknowledge message to switching node 105 for BRI station set 121. In addition, directory number management application 666 communicates to terminal management application 667 a message which results in the line-in-use indication lamp associated with the shared directory number being activated on mobile unit 122. If a person should select the line associated with the shared directory number and go off-hook on mobile unit 122, terminal management application 667 would communicate a connection message to directory number management application 666 requesting that a connection be set up through peripheral 610 between mobile unit 122 via base station 108 and switching node 105. Directory number management application 666 would be responsive to this connection message to establish a conference which would join mobile unit 122 into the call already set up between BRI station set 126 and BRI station set 121.

When switching node 105 transmitted the alerting message back to switching node 101, it includes information concerning the secondary numbers owned by switching node 105. Session layer 653 of switching node 101 is responsive to this information to insert entry 1113 into level 5 routing table 1002 of FIG. 10. Entry 1113 designates that switching node 105 owns the secondary number block of "S11XX".

Consider now the operation of the system illustrated in FIG. 1 when BRI station set 121 originates a call on the shared line associated with directory number management application 666 of switching node 101 as illustrated in FIG. 6. For the sake of this example, it is assumed that BRI station set 126 is using directory number "2001". In response to BRI station set 121 going off hook and dialing the directory number for BRI station set 126 which is "2001". Terminal management application 672 of FIG. 6 is responsive to the actions of BRI station set 121 to form a setup message which is communicated to directory number management application 666 of FIG. 6. Also, included in the setup message is the caller ID information which is secondary number "S1101" and the ultimate directory number destination which is "2001". Terminal management application 672 requests that session software layer 613 transmit this message to directory number "1101" which is the directory number identifying directory number management application 666. Session software layer 613 accesses level 5 routing table 805 of FIG. 8 and determines that the call should be routed to switching node 101. Session software layer 613 then transmits a request to transport software layer 612 for the setup message to be communicated to switching node 101. Transport software layer 612 is responsive to this request to access level 4 routing table 806 of FIG. 8 and to determine that messages are communicated to switching node 101 via PRI link 151. Network software layer 611 and peripheral 610 are responsive to the information from transport software layer 612 to transmit the setup message to switching node 101 via PRI link 15 1.

Transport software layer 652 of switching node 101 is responsive to the setup message received via layers 651 and 650 to determine that the destination switching node is 101 and to transfer the setup message to session software layer 653. The latter software layer determines that the directory number 1101 is terminated on directory number management application 666, and the setup message is communicated to directory number management application 666. Directory number management application 666 is responsive to the setup message to communicate the fact that BRI station set 121 has gone off hook to terminal management application 667 which transmits a message to base station 108 via PRI link 152. Base station 108 actuates the line-in-use indicator on mobile unit 122. This message is routed to base station 108 on the basis of the secondary number "S1102" which identifies mobile unit 122.

Then, directory number management application 666 forms a new setup message which is directed to BRI station set 126 utilizing that station set's directory number, "2001". Directory number management application 666 inserts its own directory number, "1101", into the setup message. Terminal management application 667 then requests that layers 650 through 653 of switching node 101 communicate the setup message to BRI station set 126. Session software layer 653 accesses level 5 routing table 709 of FIG. 7 and determines that the call must be routed to 102 which is the only entry that matches the dialed telephone number and requests that transport software layer 652 route the setup message to switching node 102.

When session software layer 643 of switching node 102 receives the setup message it determines from level 5 routing table 706 of FIG. 7 that the setup message should be routed to switching node 104 which owns the block of directory numbers "2XXX". Transport software layer 652 is responsive to this information to transmit the setup message back to switching node 101 as a redirect message specifying that the message should be transmitted to switching node 104.

After the setup message is received by session software layer 603 of switching node 104, this software layer accesses level 5 routing table 7 13 of FIG. 7 and determines that the setup message should be routed to switching node 109. Transport software layer 602 is responsive to this information from transport software layer 603 to access level 4 routing table 712 of FIG. 7 to determine that the setup message should be routed to switching node 109 via PRI link 158.

When the setup message is received by session software layer 623 of switching node 109, this software layer determines that the directory number is terminated on switching node 109 and transfers the setup message to terminal management application 674 which alerts BRI station set 126.

The normal flow of ISDN messages now are generated between switching node 109 and directory number management application 666 of switching node 101 utilizing the directory number dialing plan, and the normal flow of messages are communicated between directory number management application 666 and switching node 105 utilizing the secondary dialing plan as was previously described in the reverse direction in the example of BRI station set 126 placing a call to BRI station set 121.

Consider now the actions taken when mobile unit 122 is disconnected from base station 108 and registers itself on base station 107 of FIG. 1. When mobile unit 122 is not engaged in a call, it re-registers itself every 4 seconds with base station 108. If mobile unit 122 fails to re-register itself within 4 seconds, base station 108 assumes that the mobile unit is outside of its coverage. Base station 108 then transmits to switching node 101 the fact that mobile unit 122 is disconnected. Layers 650 and 651 of switching node 101 are responsive to this information from base station 108 to eliminate all information referring to mobile unit 122 from internal tables controlled by those layers. Session software layer 653 is responsive to the disconnect of mobile unit 122 to eliminate entry 1011 from level 5 routing table 1002 of FIG. 10. Directory number management application 666 is responsive to this disconnection to eliminate entry 1105 from FIG. 11. Dialing plan application 665 is responsive to the disconnection to eliminate entry 1010 from table 1001 of FIG. 10. In addition, dialing plan application 665 transmits to dialing plan application 673 the fact that it no longer hosts secondary number "S1102". In response to that message, dialing plan application 673 removes entry 9 15 from secondary dialing plan table 904 and entry 916 from level 5 routing table 905 of FIG. 9. The result of these above operations is to purge all tables of references to secondary number "S1102".

Assume now that mobile unit 122 registers itself with base station 107 which is interconnected to switching node 106 as illustrated on FIGS. 1 and 6. Terminal management application 675 of switching node 106 is responsive to the registration of mobile unit 122 on base station 107 to request that dialing plan application 676 request permission to host secondary number "S1102". Dialing plan application 676 requests that session layer 633 route to the dialing plan application which owns "S1102". Session software layer 633 has no information as to which dialing plan application owns secondary number "S1102" and routes to the switching node higher in the secondary dialing plan hierarchy as illustrated in FIG. 4. Dialing plan application 676 requests that a session be set up with dialing plan application 661 on switching node 102. This session can be easily setup since level 4 routing table 912 for node 106 of FIG. 9 has an entry defining how to communicate with switching node 102.

Once the session has been setup between dialing plan application 676 of switching node 106 and dialing plan application 661 of switching node 102, dialing plan application 676 requests permission to host secondary number "S1102". Dialing plan application 661 examines secondary dialing plan table 901 and determines that it has given ownership of the block of secondary numbers "S1XXX" to switching node 104 and. requests that the lower software layers redirect the session to dialing plan application 669 of switching node 104. Dialing plan application 669 is responsive to the session being setup to examine secondary dialing plan table 907 of FIG. 9 and determine that the block of numbers "S11XX" has been given to switching node 105. Dialing plan application 669 then through the use of a redirect message causes switching nodes 104 and 101 to redirect the call to dialing plan application 673 of switching node 105. Once a session has been setup between dialing plan application 676 of switching node 106 and dialing plan application 673 of switching node 105, dialing plan application 676 obtains permissions to host secondary number "S1102" from dialing plan application 673. Both dialing plan applications update the secondary tables dealing with the dialing plan, level 5 routing, and level 4 routing for their respective switching nodes. These updated tables are illustrated on FIG. 12.

After dialing plan application 676 of switching node 106 has received permission to host the secondary number, terminal management application 675 of switching node 106 proceeds with identifying mobile unit 122 to directory number management application 666 of switching node 101. Terminal management application 675 requests that a message be sent to directory number management application 666 informing it of the existence of mobile unit 122. This message is routed to directory number management application 666 utilizing the directory dialing plan. Terminal management application 675 requests that session software layer 633 route the message to directory number 1101 which identifies directory number management application 666. Session software layer 633 accesses level 5 routing table 802 of FIG. 8 and determines that the message should be routed to switching node 101. Transport software layer 632 is responsive to a request to route to switching node 101 to transmit the message out on PRI link 661. The messages then are routed through switching node 102 to directory number management application 666 on switching node 101. Directory number management application 666 is responsive to this message to update the directory number management table 1101 by inserting entry 1105 back into this table. (Entry 1105 had been removed when mobile unit 122 disconnected from base station 108).

Figure 13:
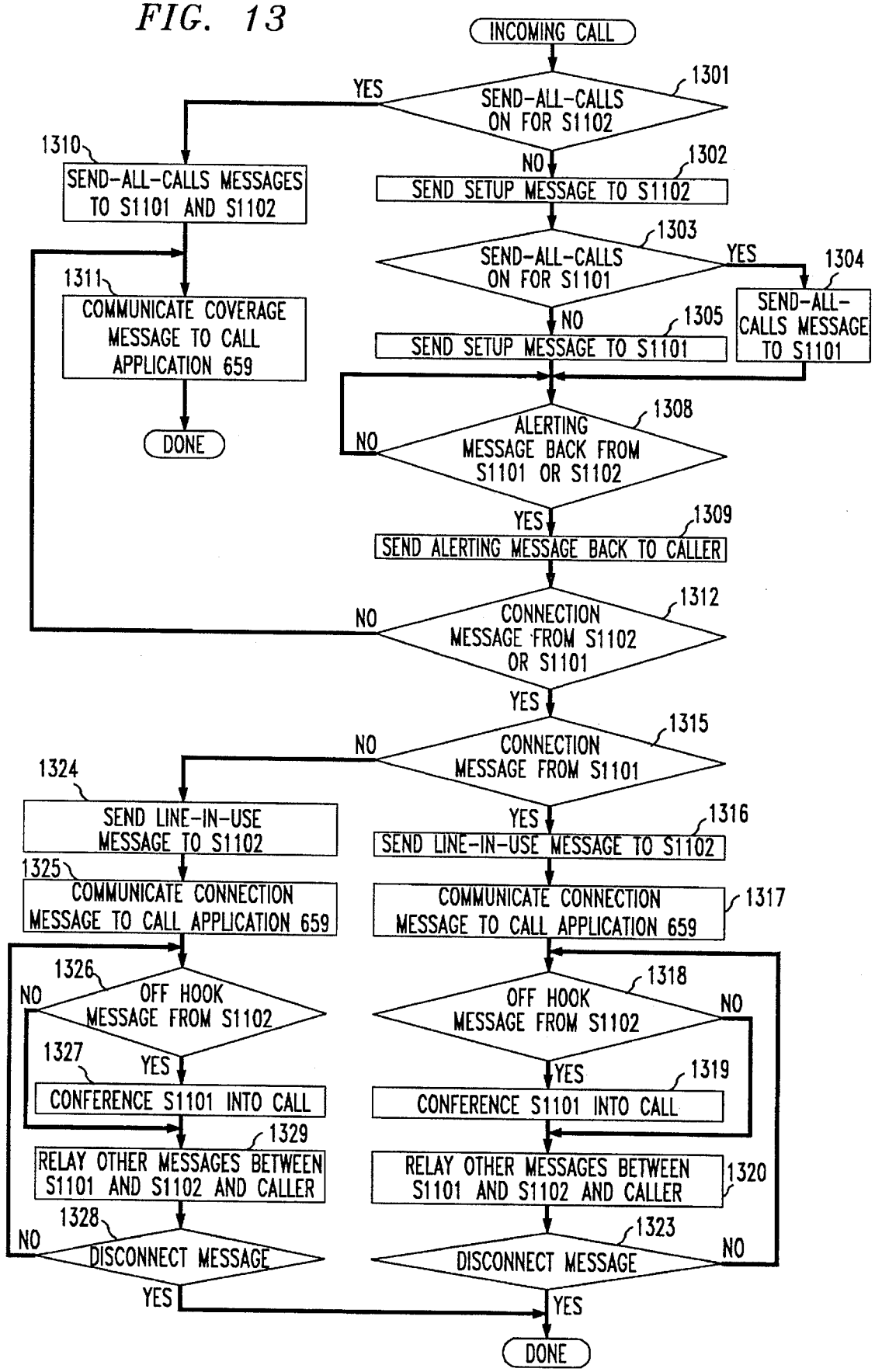
FIGS. 13 and 14 illustrate, in flow chart form, the operations performed by a directory number application program.

FIG. 13 illustrates, in flowchart form, the operations performed by directory number management application 666 of FIG. 6 in providing the features of send-all-calls and call coverage. When an incoming call is received by directory number management application 666, the application first checks in decision block 1301 if the send-all-calls button has been actuated on mobile unit 122 which is utilizing the secondary number of "S1102". If the send-all-calls button has been actuated, block 13 10 is executed to transmit the send-all-calls messages to mobile unit 122 and BRI station set 121 which is utilizing secondary number "S1101". The send-all-calls messages result in a brief burst of audio tone being emitted from these terminals. Next, block 1311 is executed which communicates a coverage message to call application 659. In response to this message, call application 659 transfers the incoming call to call coverage. In the examples of this application, the call coverage path consists only of voice mail system 127. Voice mail system 127 is responsive to the call to record a voice message for directory number 1101. Either mobile unit 122 or BRI station set 121 can retrieve this message as will be discussed with respect to FIG. 14.

Returning to decision block 1302, if the result is no, then directory number management application 666 sends a setup message to secondary number "S1102". This message results in mobile unit 122 being alerted with a ringing tone. Next, decision block 1303 checks to see whether the send-all-calls button had been actuated on BRI station set 121. If the button had been actuated on BRI station set 121, block 1304 is executed which causes a brief tone to be emitted from that station set. However, if the result of decision block 1303 is no, then directory number management application 666 transmits a setup message to BRI station set 121.

Decision block 1308 checks for an alerting message coming back from either mobile unit 122 or BRI station set 121. The alerting message indicates that a terminal is being rung. Once either terminal transmits the alerting message back, directory number management application 666 sends an alerting message to the calling terminal.

After transmission of the alerting message to the calling terminal, decision block 1312 is executed waiting until a connection message is received from either mobile unit 122 or BRI station set 121 or a predefined amount of time elapses. If neither responds to the call within the predetermined amount of time, control is transferred to block 1311 whose functions were previously discussed. If either unit answers the call, decision block 1315 is executed. The purpose of this block is to determine whether mobile unit 122 or BRI station set 121 answered the call so that the idle unit can receive a line-in-use message which results in the line-in-use indicator being actuated on the receiving unit. If a connection message is received from BRI station set 121, block 1316 transmits the line-in-use message to mobile unit 122. Next, directory number management application 666 transmits a connection message to the calling terminal.

Decision block 1318 checks to see whether an off hook message has been received from mobile unit 1102 which indicates that mobile unit 122 wants to enter into the call which is now in progress between BRI station set 121 and the calling terminal. If mobile unit 122 does go off hook, directory number management application 666 transmits a message to peripheral 650 causing mobile unit 122 to be conferenced into the call.

The purpose of block 1320 is to receive messages from mobile unit 122 and BRI station set 121 which are transmitted to directory number management application 666 via the directory dialing plan. Each such message is changed so that the message has at its originating terminal directory number "1101" and the user's name before those messages are sent to the calling terminal. Similarly, messages received from the calling terminal are retransmitted to mobile unit 122 and BRI station set 121 via the secondary dialing plan but with no changes to information concerning the calling terminal.

Decision block 1323 checks to see whether a message received from mobile unit 122 or BRI station set 121 or the calling terminal is a disconnect message. A disconnect message from the calling terminal terminates the call or a disconnect message from the last unit using secondary numbers on the call (mobile unit 122 and BRI station set 121) terminates the call. If the call is not terminated, control is passed from decision block 1323 back to decision block 13 18. Once the call has been terminated, the processing of an incoming call is completed.

Blocks 1324 through 1329 of FIG. 13 function in a similar manner to that previously described for blocks 13 15 through 1312. The difference being that blocks 1324 through 1328 assume that mobile unit 122 responded to the incoming call rather than BRI station set 121.

In summary, FIG. 13 has illustrated the fact that the functions of the send-all-calls and call coverage features is totally independent of the physical location of mobile unit 122 and BRI station set 121 since messages directed to these units utilize the secondary dialing plan and messages from these terminals utilizing the directory plan to transmit messages to directory number management application 666. From the point of view of other terminals on the system illustrated in FIG. 1, the directory number shared by mobile unit 122 and BRI station set 121 terminates calls and remains on switching node 101. Consequently, all interactions of these features which are dependent upon the switching node remain the same irrespective of the locations of mobile unit 122 or BRI station set 121. For example, call coverage assumes that the unit is located on the same switching node as the call coverage path. In addition, voice mail system 127 allows certain short cuts in the logon process if the user is calling from a station set connected to switching node 101.

Figure 14:
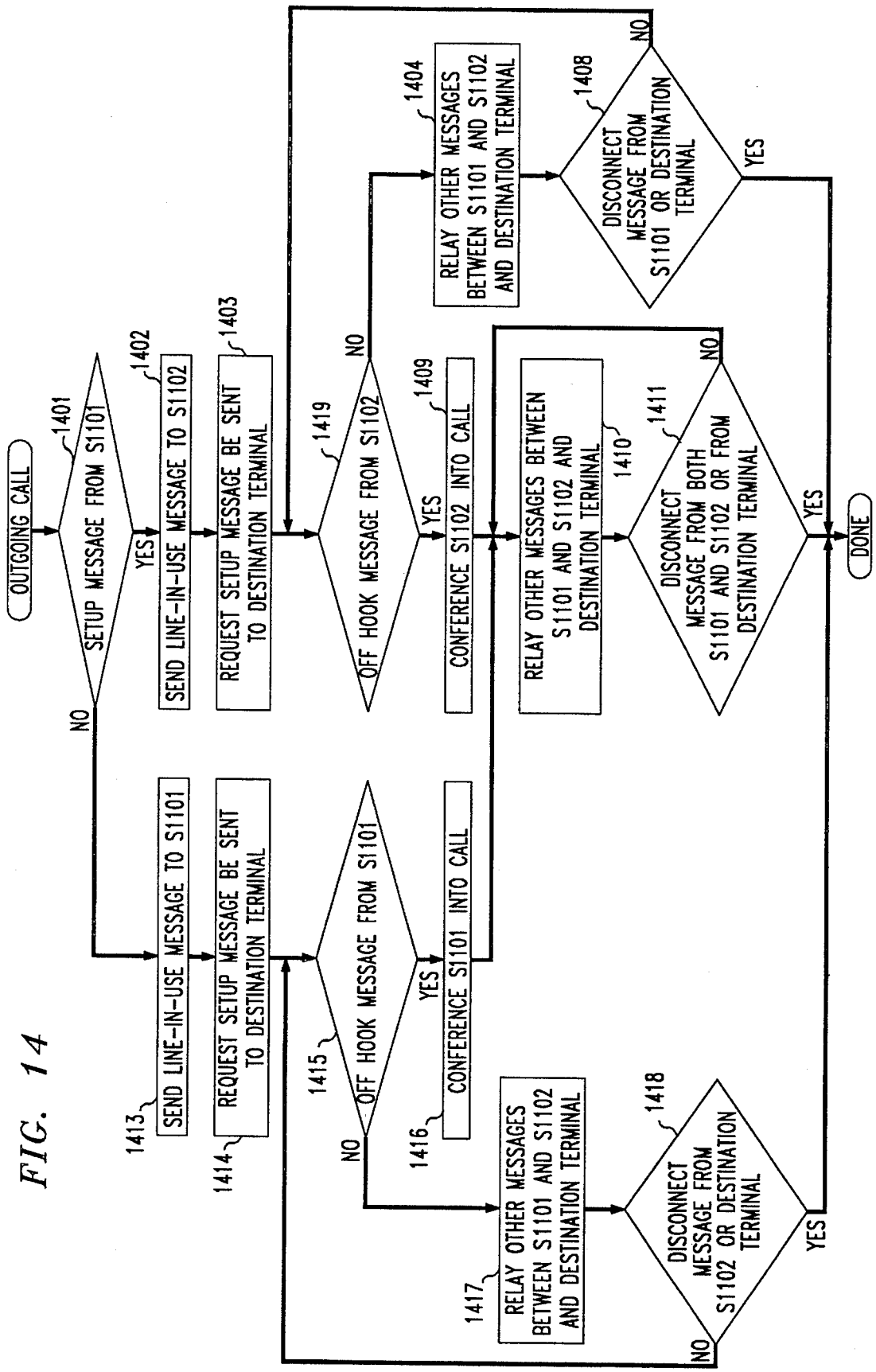

FIG. 14 illustrates, in flowchart form, the operations performed by directory number management application 666 when either mobile unit 122 or BRI station set 121 originates a call. When either unit originates a call, the line-in-use indicator must be actuated on the other terminal. Basically, an origination of a call by either terminal results in that call being first setup to directory number management application 666. The latter application then sets up the remainder of the call to the called/destination terminal. FIG. 14 has two main paths depending on whether the setup message was originally received from mobile unit 122 ("S1102" secondary number) or from BRI station set ("S1101" secondary number). The operations of FIG. 14 will be described with respect to BRI station set 121 originating the call.

Decision block 1401 determines whether the setup message is from mobile unit 122 or BRI station set 121. If the message is from BRI station set 121, block 1402 is executed which transmits a line-is-use message to mobile unit 1102. This message will cause the line-in-use indicator for mobile unit 122 to be actuated. Next, directory number management application 666 transmits a setup message to the called terminal which was identified by BRI station set 121.

After transmission of the setup message from directory number management application 666 to the called terminal, decision block 1403 is checked to determine if mobile unit 122 has gone off hook which indicates that mobile unit 122 wants to be part of the call between BRI station set 121 and the called terminal. If the result of the execution of decision block 1403 is yes, block 1409 is executed which causes mobile unit 122 to be conferenced into the present call. Next, 1410 is executed which relays the messages received from mobile unit 122 and BRI station set 121 to the called terminal and vice versa. Decision block 1411 checks to see whether one of these messages was a disconnect message which results in no parties being present on one side of the call. If the results of decision block 1411 is no, control is returned back to block 1410. If the result of decision block 1411 is yes, the call is terminated.

Returning to decision block 1403, if mobile unit 122 has not gone off hook, control is transferred to block 1404 which performs the same operations as previously discussed for block 1410. Decision block 1408 checks to see whether BRI station set 121 or the called terminal has transmitted a disconnect message. If the answer is yes, the call is terminated. However, if the answer is no, control is transferred back to decision block 1403.

Blocks 1413 through 1418 function in a similar manner to that of blocks 1402 through 1411 with the exception that the terminal originating the call is mobile unit 122.

Consider a user accessing voice mail system 127 from either mobile unit 122 or BRI station set 121. From the perspective of voice mail system 127, it is dealing with a terminal which is directly connected to switching node 101 since the directory telephone number "1101" terminates on switching node 101. Voice mail system 127 is not aware of the fact that it is interacting with an application but rather assumes that it is interacting with a terminal. Consequently, the operation of voice mail system 127 is totally unaffected by the physical location of either mobile unit 122 or BRI station set 121.

Thus far, the description of the system of FIG. 1 has assumed that a BRI station set and a mobile unit are sharing a directory telephone number. This is not necessary since it has been described how BRI station set 121 can function when mobile unit 122 is not registered on the system. To maintain feature transparency as a mobile unit moves throughout the system illustrated in FIG. 1, it may be desirable that a mobile unit be assigned a directory number which is controlled by a directory management application and is not shared with a BRI station set. The directory management application communicates with the mobile unit via the secondary dialing plan. As previously described, the operations of the features would appear to be being performed by a terminal directly connected to the switching node upon which the directory number management application resided. This would allow transparency of such features as call coverage, send-all-calls, and voice mail operations for a mobile unit.

It is to be understood that the above-described embodiments are merely illustrative of principles of the invention and that other arrangements may be devised by those skilled in the art without departing from the spirit or scope of the invention.

We claim:

1. A method for providing telephone service to wireless telephones and telephone station sets by a telecommunication switching system having a plurality of switching nodes, the method comprising the steps of:

assigning by the telecommunication switching system a directory number of a directory dialing plan to both a wireless telephone and a telephone station set, a secondary number of a secondary dialing plan to the wireless telephone, and another secondary number of the secondary dialing plan to the telephone station set;

routing by the telecommunication switching system incoming call information for an incoming call from a calling telephone for the directory number to both the wireless telephone using the secondary number and to the telephone station set using the other secondary number while the incoming call is active;

transmitting first control information by the wireless telephone in response to the routing of the incoming call information addressed to the directory number to the telecommunication switching system;

transmitting second control information to the telephone station set by the telecommunication switching system in response to the first control information;

transmitting third control information to a calling terminal originating the incoming call by the telecommunication switching system in response to the first control information;

executing a directory number management application on the telecommunication switching system to manage incoming calls;

identifying the wireless telephone to a first switching node of the telecommunication switching system by the secondary number;

identifying the telephone station set to the first switching node of the telecommunication switching system by the other secondary number; and identifying the wireless telephone and telephone station set as being connected to the first switching node to the directory number management application by the directory number.

2. The method of claim 1 wherein the incoming call information is call setup information.

3. The method of claim 2 further comprises the step of establishing a voice path between the calling telephone and the wireless telephone by the telecommunication switching system.

4. The method of claim 1 wherein the step of routing comprises the steps of accepting by the directory number management application the incoming call information;

communicating the incoming call information to the first switching node for the wireless telephone by the directory number management application using the secondary number; and communicating the incoming call information to the first switching node for the telephone station set by the directory number management application using the other secondary number.

5. The method of claim 4 wherein the step of transmitting the first control information comprises the step of routing the first control information to the directory number management application using the directory number.

6. The method of claim 5 further comprises the step of communicating other incoming call information to the wireless telephone using the other secondary number and to the telephone station set using the secondary number.

7. The method of claim 4 wherein the step of assigning further comprises the steps of disconnecting the wireless telephone from the first switching node;

re-identifying the wireless telephone to a second switching node of the telecommunication switching system by the secondary number; and re-identifying the wireless telephone as being connected to the second switching node to the directory number management application by the directory number.

8. The method of claim 7 wherein the step of routing further comprises the step of communicating the incoming call information to the second switching node for the wireless telephone by the directory number management application using the secondary number.

9. The method of claim 8 wherein the directory number management application is executing on the first switching node and the step of transmitting the first control information comprises the step of routing the first control information to the directory number management application by the wireless telephone using the directory number to route from the second switching node.

10. A method for providing transparency of call features across a telecommunication switching system having a plurality of switching nodes for a wireless telephone connectable to any of the switching nodes and routing calls through the telecommunication switching system using a directory dialing plan and secondary dialing plan, the method comprising the steps of:

executing a directory number management application on a first one of the switching nodes;

assigning a directory number to the directory number management application for originating and terminating calls;

connecting the wireless telephone on a second one of the switching nodes and identifying the wireless telephone as having a secondary number from the secondary dialing plan;

identifying the wireless telephone to the directory number management application as using the directory number and the secondary number;

receiving by the directory number management application a first incoming call from the wireless telephone; and retransmitting the first incoming call as a first outgoing call identified as originating from the first one of the switching nodes and the directory number with location sensitive features assuming the location of the first one of the switching nodes and directory number sensitive features assuming the directory number.

11. The method of claim 10 further comprises the steps of disconnecting the wireless telephone from the second one of the switching nodes;

re-connecting the wireless telephone on a third one of the switching nodes and identifying the wireless telephone as having the secondary number from the secondary dialing plan;

identifying the wireless telephone to the directory number management application as using the directory number and the secondary number;

receiving by the directory number management application a second incoming call from the wireless telephone; and retransmitting the second incoming call as a second outgoing call identified as originating from the first one of the switching nodes and the directory number with location sensitive features assuming the location of the first one of the switching nodes and directory number sensitive features assuming the directory number.

12. The method of claim 10 further comprises the steps of receiving a second incoming call from a telephone terminal by the directory number management application with location sensitive features assuming the location of the first one of the switching nodes and directory number sensitive features assuming the directory number;

originating a second outgoing call by the directory number management application to the wireless telephone using the secondary number for routing the second outgoing call to the second one of the switching nodes in response to the second incoming call; and interconnecting the second incoming and second outgoing calls together by the directory number management application.

13. The method of claim 12 further comprises the steps of disconnecting the wireless telephone from the second one of the switching nodes;

re-connecting the wireless telephone on a third one of the switching nodes and identifying the wireless telephone as having the secondary number from the secondary dialing plan;

identifying the wireless telephone to the directory number management application as using the directory number and the secondary number;

receiving a third incoming call from the telephone station set by the directory number management application with location sensitive features assuming the location of the first one of the switching nodes and directory number sensitive features assuming the directory number;

originating a third outgoing call by the directory number management application to the wireless telephone using the secondary number for routing the third outgoing call to the third one of the switching nodes in response to the third incoming call; and interconnecting the third incoming and third outgoing calls together by the directory number management application.

14. An apparatus for providing telephone service to wireless telephones and telephone station sets by a telecommunication switching system having a plurality of switching nodes, the apparatus comprising:

means for assigning by the telecommunication switching system a directory number of a directory dialing plan to both a wireless telephone and to a telephone station set, a secondary number of a secondary dialing plan to the wireless telephone, and another secondary number of the secondary dialing plan to the telephone station set;

means for routing by the telecommunication switching system incoming call information for an incoming call from a calling telephone for the directory number to the wireless telephone using the secondary number and to the telephone station set using the other secondary number while the incoming call is active;

means for transmitting first control information by the wireless telephone in response to the routing of the incoming call information addressed to the directory number to the telecommunication switching system;

means for transmitting second control information to the telephone station set by the telecommunication switching system in response to the first control information;

means for transmitting third control information to a calling terminal originating the incoming call by the telecommunication switching system in response to the first control information;

means for executing a directory number management application on the telecommunication switching system to manage incoming calls;

means for identifying the wireless telephone to a first switching node of the telecommunication switching system by the secondary number;

means for identifying the telephone station set to the first switching node of the telecommunication switching system by the other secondary number; and means for identifying the wireless telephone and telephone station set as being connected to the first switching node to the directory number management application by the directory number.

15. The apparatus of claim 14 wherein the incoming call information is call setup information.

16. The apparatus of claim 15 further comprises means for establishing a voice path between the calling telephone and the wireless telephone by the telecommunication switching system.

17. The apparatus of claim 14 wherein the means for routing comprises means for accepting by the directory number management application the incoming call information;

means for communicating the incoming call information to the first switching node for the wireless telephone by the directory number management application using the secondary number; and means for communicating the incoming call information to the first switching node for the telephone station set by the directory number management application using the other secondary number.

18. The apparatus of claim 17 wherein the means for transmitting the first control information comprises means for routing the first control information to the directory number management application using the directory number.

19. The method of claim 18 further comprises means for communicating other incoming call information to the wireless telephone using the other secondary number and to the telephone station set using the secondary number.

20. The apparatus of claim 17 wherein the means for assigning further comprises means for disconnecting the wireless telephone from the first switching node;

means for re-identifying the wireless telephone to a second switching node of the telecommunication switching system by the secondary number; and means for re-identifying the wireless telephone as being connected to the second switching node to the directory number management application by the directory number.

21. The apparatus of claim 20 wherein the means for routing further comprises means for communicating the incoming call information to the second switching node for the wireless telephone by the directory number management application using the secondary number.

22. The apparatus of claim 21 wherein the directory number management application is executing on the first switching node and the means for transmitting the first control information comprises means for routing the first control information to the directory number management application by the wireless telephone using the directory number to route from the second switching node.

23. An apparatus for providing transparency of call features across a telecommunication switching system having a plurality of switching nodes for a wireless telephone connectable to any of the switching nodes and routing calls through the telecommunication switching system using a directory dialing plan and secondary dialing plan, the apparatus comprising:

means for executing a directory number management application on a first one of the switching nodes;

means for assigning a directory number to the directory number management application for originating and terminating calls;

means for connecting the wireless telephone on a second one of the switching nodes and identifying the wireless telephone as having a secondary number from the secondary dialing plan;

means for identifying the wireless telephone to the directory number management application as using the directory number and the secondary number;

means for receiving by the directory number management application a first incoming call from the wireless telephone; and means for retransmitting the first incoming call as a first outgoing call identified as originating from the first one of the switching nodes and the directory number with location sensitive features assuming the location of the first one of the switching nodes and directory number sensitive features assuming the directory number.

24. The apparatus of claim 23 further comprises means for disconnecting the wireless telephone from the second one of the switching nodes;

means for re-connecting the wireless telephone on a third one of the switching nodes and identifying the wireless telephone as having the secondary number from the secondary dialing plan;

means for identifying the wireless telephone to the directory number management application as using the directory number and the secondary number;

means for receiving by the directory number management application a second incoming call from the wireless telephone; and means for retransmitting the second incoming call as a second outgoing call identified as originating from the first one of the switching nodes and the directory number with location sensitive features assuming the location of the first one of the switching nodes and directory number sensitive features assuming the directory number.

25. The apparatus of claim 23 further comprises means for receiving a second incoming call from a telephone terminal by the directory number management application with location sensitive features assuming the location of the first one of the switching nodes and directory number sensitive features assuming the directory number;

means for originating a second outgoing call by the directory number management application to the wireless telephone using the secondary number for routing the second outgoing call to the second one of the switching nodes in response to the second incoming call; and means for interconnecting the second incoming and second outgoing calls together by the directory number management application.

26. The apparatus of claim 23 further comprises means for disconnecting the wireless telephone from the second one of the switching nodes;

means for re-connecting the wireless telephone on a third one of the switching nodes and identifying the wireless telephone as having the secondary number from the secondary dialing plan;

means for identifying the wireless telephone to the directory number management application as using the directory number and the secondary number;

means for receiving a third incoming call from the telephone station set by the directory number management application with location sensitive features assuming the location of the first one of the switching nodes and directory number sensitive features assuming the directory number;

means for originating a third outgoing call by the directory number management application to the wireless telephone using the secondary number for routing the third outgoing call to the third one of the switching nodes in response to the third incoming call; and means for interconnecting the third incoming and third outgoing calls together by the directory number management application.

* * * * *